(12) United States Patent
Kendall

(10) Patent No.: US 8,033,717 B2
(45) Date of Patent: *Oct. 11, 2011

(54) DEVICE FOR MEASURING TEMPERATURE IN MOLTEN METALS

(75) Inventor: Martin Kendall, Hasselt (BE)

(73) Assignee: Heraeus Electro-Nite International N.V., Houthalen (BE)

( * ) Notice: Subject to any disclaimer, the term of this patent is extended or adjusted under 35 U.S.C. 154(b) by 0 days.

This patent is subject to a terminal disclaimer.

(21) Appl. No.: 12/575,105

(22) Filed: Oct. 7, 2009

(65) Prior Publication Data

US 2010/0046578 A1  Feb. 25, 2010

Related U.S. Application Data

(62) Division of application No. 11/465,849, filed on Aug. 21, 2006, now Pat. No. 7,712,957.

(30) Foreign Application Priority Data

Aug. 24, 2005  (DE) .......................... 10 2005 040 311

(51) Int. Cl.
*G01K 7/00* (2006.01)
*G01K 1/12* (2006.01)
*H01L 35/00* (2006.01)

(52) U.S. Cl. .................. 374/139; 374/140; 136/234

(58) Field of Classification Search .................. 374/139, 374/140; 136/234
See application file for complete search history.

(56) References Cited

U.S. PATENT DOCUMENTS

| | | |
|---|---|---|
| 2,802,894 A | 8/1957 | Schneider et al. |
| 2,915,575 A | 12/1959 | Thomas |
| 3,116,168 A | 12/1963 | Gee |
| 3,379,578 A | 4/1968 | McTaggart et al. |
| 3,821,030 A | 6/1974 | Darling |
| 4,060,095 A | 11/1977 | Kurita |
| 4,135,538 A | 1/1979 | Kurita |
| 4,721,533 A | 1/1988 | Phillippi et al. |
| 4,984,904 A | 1/1991 | Nakano et al. |
| 5,181,779 A | 1/1993 | Shia et al. |
| 5,209,471 A | 5/1993 | Horiuchi et al. |
| 5,209,571 A | 5/1993 | Kendall |

(Continued)

FOREIGN PATENT DOCUMENTS

CN  2063634  10/1990

(Continued)

OTHER PUBLICATIONS

Chinese Office Action from the Chinese Patent Office dated Nov. 14, 2008 in Chinese Patent Application No. 200610111037.7.

(Continued)

*Primary Examiner* — Lisa Caputo
*Assistant Examiner* — Mirellys Jagan
(74) *Attorney, Agent, or Firm* — Panitch Schwarze Belisario & Nadel LLP

(57) ABSTRACT

A device is provided for temperature measurement in metal melts, particularly in iron or steel melts, having a thermoelement, which is arranged in a thermoelement tube, and having an exterior protective body, which is essentially formed of graphite and metal oxide. The thermoelement tube is arranged in the protective body with a spacing, forming an intermediate space, and an insulating material and an oxygen-reducing material are arranged in the intermediate space. The insulating material and the oxygen-reducing material, as a powder mixture, form a tube (2), which surrounds the thermoelement tube (3) with a spacing and/or which is surrounded by the protective body (1) with a spacing.

15 Claims, 3 Drawing Sheets

U.S. PATENT DOCUMENTS

| | | |
|---|---|---|
| 5,388,908 A | 2/1995 | Kendall |
| 5,474,618 A | 12/1995 | Allaire |

FOREIGN PATENT DOCUMENTS

| | | | |
|---|---|---|---|
| CN | 2708284 | Y | 7/2005 |
| DE | 1 648 261 | A1 | 5/1971 |
| DE | 101 06 476 | C1 | 10/2002 |
| EP | 0 558 808 | B1 | 6/1998 |
| FR | 901657 | A | 8/1945 |
| GB | 1151019 | A | 5/1969 |
| GB | 2 193 375 | A | 2/1988 |
| JP | 60-198423 | A | 10/1985 |
| JP | 61-246636 | A | 11/1986 |
| JP | 01169329 | A | 7/1989 |
| JP | 6011396 | A | 1/1994 |
| JP | 8021768 | A | 1/1996 |
| JP | 8271347 | A | 10/1996 |
| JP | 2596789 | B2 | 4/1997 |
| JP | 11-160161 | A | 6/1999 |
| JP | 11166865 | A | 6/1999 |
| JP | 11183265 | A | 7/1999 |
| JP | 2002296122 | A | 10/2002 |
| WO | 9107643 | A1 | 5/1991 |

OTHER PUBLICATIONS

Japanese Office Action dated Nov. 26, 2010 from the Japanese Patent Office in counterpart Japanese Patent Application No. 2006-211448 (with English translation).

Office Action issued Jul. 12, 2011 in JP Application No. 2006-211448 (English translation).

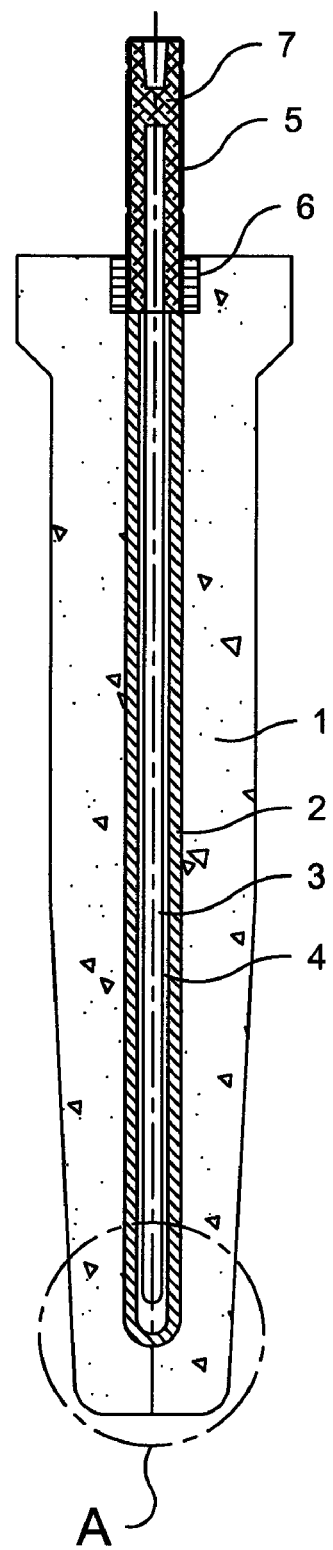
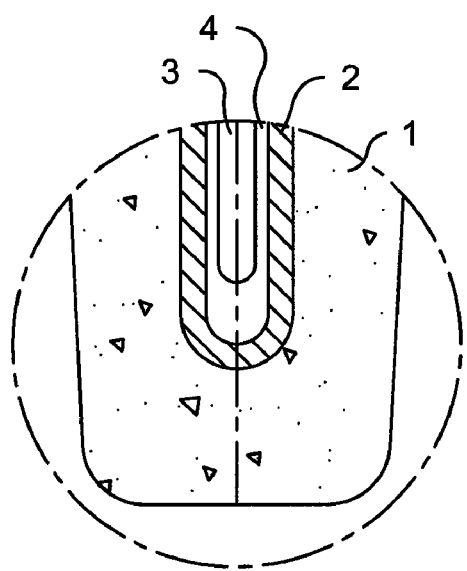
Fig. 1
Fig. 1A

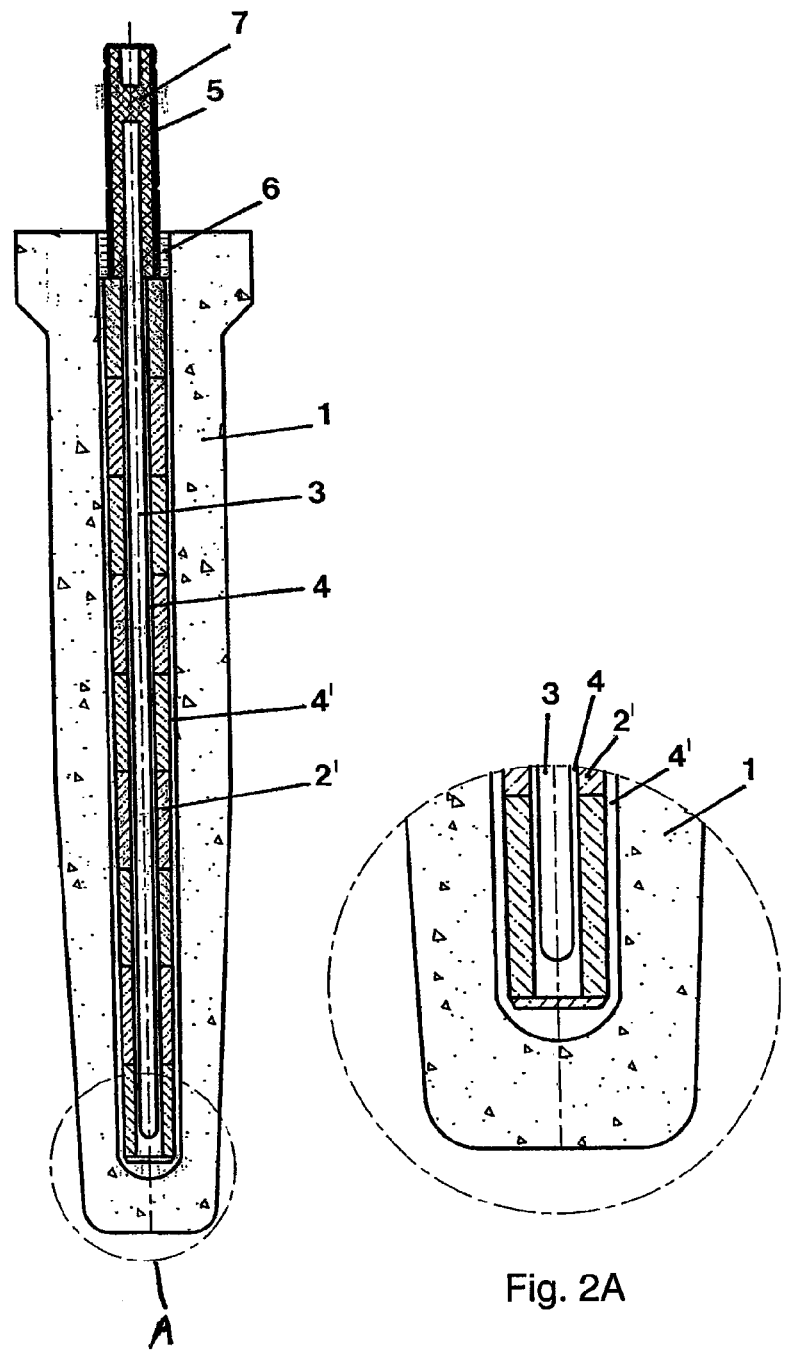

Fig. 3
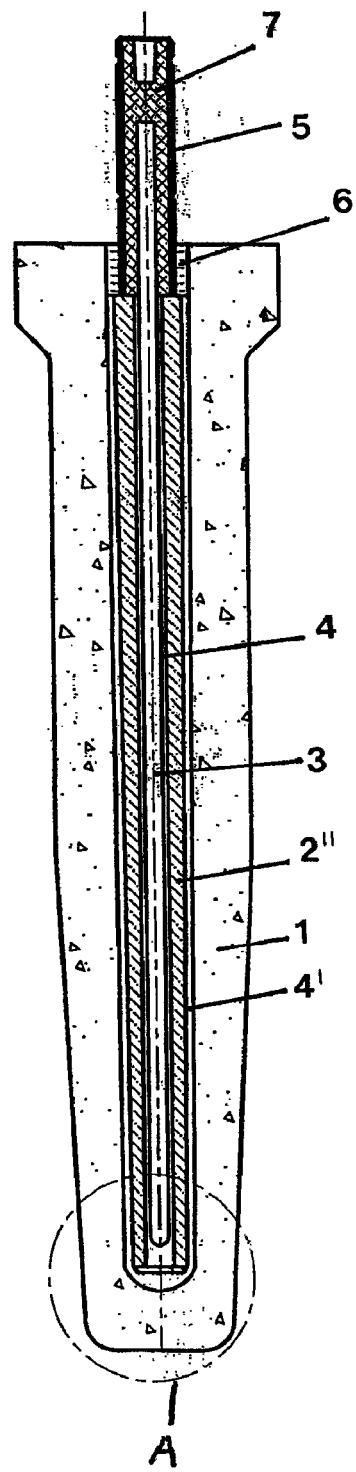
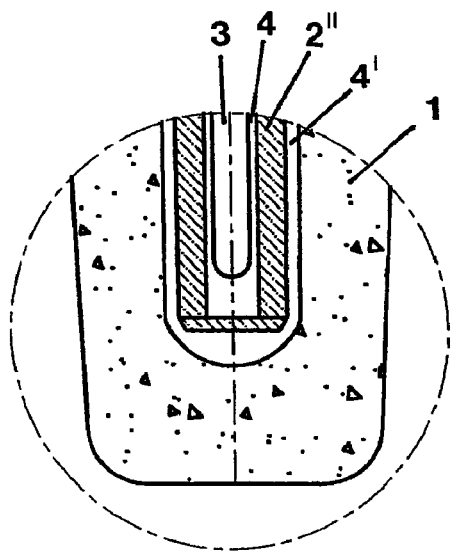
Fig. 3A

DEVICE FOR MEASURING TEMPERATURE IN MOLTEN METALS

CROSS-REFERENCE TO RELATED APPLICATIONS

This application is a divisional of copending U.S. patent application Ser. No. 11/465,849, filed Aug. 21, 2006, the disclosure of which is incorporated herein by reference.

BACKGROUND OF THE INVENTION

The invention relates to a device for temperature measurement in molten metals, particularly in iron or steel melts, having a thermoelement, which is arranged in a thermoelement tube, and having an exterior protective body, which is essentially formed of graphite and metal oxide. The thermoelement tube is arranged in the protective body with a spacing, forming an intermediate space, and an insulating material and an oxygen-reducing material are arranged in the intermediate space. Furthermore, the invention relates to a method for producing such a device.

Such devices are known, for example, from European Patent EP 558 808 B1 and U.S. Pat. No. 5,209,571. In these patents there is described, for protecting the thermoelement, a getter material arranged between the thermoelement tube and the exterior protective body. This getter material may surround the thermoelement tube in a tube-shaped manner. The material of the device is exposed during use to greater temperature fluctuations and is therefore subject to thermal stresses. The thermal stresses can lead to damage of the individual materials. Furthermore, similar devices are known from U.K. Patent GB 2193375.

BRIEF SUMMARY OF THE INVENTION

The invention is therefore based on the object of providing a device for measuring temperature in molten metals, which improves the existing devices.

The device according to the invention for measuring temperature in molten metals, particularly in iron or steel melts, has a thermoelement, which is arranged in a thermoelement tube. Further, it has an exterior protective body, which is formed essentially of graphite and metal oxide, The thermoelement tube is arranged in the protective body at a spacing, forming an intermediate space, and an insulating material and an oxygen-reducing material are arranged in the intermediate space.

A thermoelement tube in the sense of the invention will be understood to mean a tube closed on at least one end, in which the thermoelement wires are arranged, wherein the thermoelement wires are separated from one another by at least one insulating body. This insulating body can be embodied, for example, as a double tube or as individual tube segments. The insulating material and the oxygen-reducing material in the form of a powder mixture form a tube, which encircles the thermoelement tube with a spacing and/or which is surrounded by the protective body with a spacing. Due to the fact that this powder mixture tube is also movable in reference to the thermoelement tube and/or the protective body, thermal stresses are compensated, so that the device in its entirety is less susceptible to breakage.

Preferably, the insulating material is an oxide, particularly aluminum oxide, and the oxygen-reducing material is a non-precious (base) metal, particularly aluminum. In reference to the powder mixture, the aluminum content amounts advantageously to 10 to 40 wt. %, particularly 15 to 33 wt. %.

The tube can be closed, open at both ends, or be embodied as a plurality of tube segments arranged one behind another. The powder mixture may also include a binder. Binders for high-temperature applications are generally known, for example a phenol binder or a methyl-cellulose binder can be used. They reinforce the material of the tubes without compromising the desired getter function. The tube itself can be pressed in dry state, molded, extruded, or produced via plasma injection, which yields a high density of the tube at minimal porosity and low permeability for oxidizing gases.

The distance between the tube made of the insulating material and the oxygen-reducing material, on the one hand, and the thermoelement tube or the protective body, on the other hand, can be at least partially filled with gas, fibers, or balls without preventing the mobility required. The mentioned fibers or balls contribute to the stabilization of the arrangement. The fibers or balls can be made of aluminum oxide or a mixture of an oxide, particularly aluminum oxide, and an oxygen-reducing material, particularly a base metal, such as aluminum. The gas can be a mixture of gases, particularly nitrogen.

The object is attained with a method according to the invention for producing the described device, such that a tube is formed from the powder mixture, into which the thermoelement is inserted, and that a protective body is arranged around the tube. It is also possible first to insert the tube (getter tube) into the protective body, (and compress it together, for example) and subsequently to insert the thermoelement tube.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 1 is a schematic, longitudinal section view of a device according to one embodiment of the invention with a closed oxygen-reducing tube;

FIG. 1A is an enlarged detail view of the area A in FIG. 1;

FIG. 2 is a schematic, longitudinal section view of a device according to another embodiment of the invention with a tube made of a plurality of tube segments;

FIG. 2A is an enlarged detail view of the area A in FIG. 2

FIG. 3 is a schematic, longitudinal section view of a device according to a further embodiment of the invention with an open oxygen-reducing tube; and FIG. 3A is an enlarged detail view of the area A in FIG. 3.

DETAILED DESCRIPTION OF THE INVENTION

FIGS. 1 and 1A show one embodiment of the invention as an example. In an exterior protective body 1, made of a mixture of graphite and aluminum oxide with a content of aluminum oxide ranging approximately from 50 to 60 wt. %, there is arranged in its central bore an insulating material and an oxygen-reducing material as a getter tube 2, made of a mixture of aluminum oxide and aluminum with an aluminum content amounting to approximately 20 wt. %. The getter tube 2 is pressed together with the exterior protective body 1. A thermoelement tube 3 is arranged in the getter tube 2, wherein between the thermoelement tube 3 and the getter tube 2, a spacing 4 is formed. The thermoelement tube 3 opens, at its one end, protruding from the exterior protective body 1, in a so-called contact piece 5, which is provided with another measurement wire for contact. The thermoelement tube 3 is fixed to the contact piece 5 via cement 6 in the exterior protective body 1. A cement 7 is likewise introduced inside the contact piece 5 for fixing the thermoelement tube 3 in the tube-shaped contact piece 5. Air is present in the spacing 4.

FIGS. 2 and 2A show another embodiment of the invention. Here, in the exterior protective body 1, a getter tube 2' is arranged, which is formed from a plurality of tube segments fixed to one another. The getter tube 2' forms a spacing 4' with the exterior protective body 1 and a spacing 4 with the thermoelement 3 arranged in the getter tube 2'. The thermoelement tube 3 opens in the contact piece 5 and is fixed therein with cement 7. The contact piece 5 is fixed with cement 6 in the exterior protective body 1.

FIGS. 3 and 3A show a similar embodiment of the invention, in which the getter tube 2" is made as a single piece and is arranged in the exterior protective body 1 forming a spacing 4'. A spacing 4 is also provided between the getter tube 2" and the thermoelement tube 3 arranged therein.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A device for temperature measurement in metal melts, the device comprising a thermoelement arranged in a thermoelement tube, an exterior protective body essentially formed of graphite and metal oxide, the thermoelement tube being arranged with a spacing in the protective body, thereby forming an intermediate space between the tube and the body, and an insulating material and an oxygen-reducing material arranged in the intermediate space, the insulating material and the oxygen-reducing material being in a form of a powder mixture that forms a tube (2; 2'; 2"), which surrounds the thermoelement tube (3) with a spacing, and/or which is surrounded by the protective body (1) with a spacing.

2. The device according to claim 1, wherein the tube (2; 2'; 2") is closed on one end, open at both ends, or is formed as a plurality of tube segments.

3. The device according to claim 1, wherein the powder mixture of the tube (2; 2'; 2") includes a binder.

4. The device according to claim 1, wherein the device is designed for temperature measurement in iron or steel melts.

5. A method for producing a device according to claim 1, comprising forming a tube from the powder mixture, inserting the thermoelement (3) into the powder mixture tube, and arranging the protective body (1) around the powder mixture tube.

6. The device according to claim 1, wherein the insulating material comprises an oxide, and the oxygen-reducing material comprises a base metal.

7. The device according to claim 6, wherein the insulating material comprises aluminum oxide, and the base metal comprises aluminum.

8. The device according to claim 7, wherein the aluminum content, in reference to the powder mixture, ranges from 10 to 40 wt. %.

9. The device according to claim 8, wherein the aluminum content, in reference to the powder mixture, ranges from 15 to 33 wt. %.

10. The device according to claim 1, wherein the spacing between the powder mixture tube (2; 2'; 2"), on the one hand, and the thermoelement tube (3) or the protective body (1), on the other hand, is at least partially filled with gas, fibers, or balls.

11. The device according to claim 10, wherein the gas is a gas mixture.

12. The device according to claim 11, wherein the gas comprises nitrogen.

13. The device according to claim 10, wherein the fibers or balls are formed of aluminum oxide or of a mixture of an oxide and an oxygen-reducing material.

14. The device according to claim 13, wherein the fibers or balls are formed of aluminum oxide or of a mixture of aluminum oxide and a base metal.

15. The device according to claim 14, wherein the base metal comprises aluminum.

* * * * *